US009099029B2

(12) United States Patent
Wu et al.

(10) Patent No.: US 9,099,029 B2
(45) Date of Patent: Aug. 4, 2015

(54) CONTROL CIRCUIT OF DISPLAY PANEL AND CONTROL METHOD OF THE SAME

(75) Inventors: Meng-Ju Wu, Hsin-Chu (TW); Chun-Fan Chung, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 704 days.

(21) Appl. No.: 13/303,260

(22) Filed: Nov. 23, 2011

(65) Prior Publication Data

US 2012/0169708 A1 Jul. 5, 2012

(30) Foreign Application Priority Data

Dec. 30, 2010 (TW) ................................ 99147036 A

(51) Int. Cl.
*G06F 3/048* (2013.01)
*G09G 3/20* (2006.01)

(52) U.S. Cl.
CPC ........ *G09G 3/2096* (2013.01); *G09G 2310/027* (2013.01); *G09G 2330/045* (2013.01); *G09G 2330/12* (2013.01); *G09G 2340/0435* (2013.01); *G09G 2370/08* (2013.01)

(58) Field of Classification Search
None
See application file for complete search history.

(56) References Cited

U.S. PATENT DOCUMENTS

| | | | | |
|---|---|---|---|---|
| 4,646,059 | A * | 2/1987 | Iwamoto et al. | 340/461 |
| 5,771,031 | A * | 6/1998 | Kinoshita et al. | 345/98 |
| 6,906,900 | B2 | 6/2005 | Bennett et al. | |
| 2003/0188211 | A1 | 10/2003 | Chen | |
| 2005/0184946 | A1 * | 8/2005 | Pyoun et al. | 345/94 |
| 2006/0221047 | A1 | 10/2006 | Tanizoe et al. | |
| 2007/0109235 | A1 | 5/2007 | Hsu et al. | |
| 2008/0082290 | A1 | 4/2008 | Jeong et al. | |
| 2009/0322395 | A1 | 12/2009 | Nakamura et al. | |
| 2011/0025666 | A1 * | 2/2011 | Baek et al. | 345/211 |

FOREIGN PATENT DOCUMENTS

| | | | |
|---|---|---|---|
| CN | 1766703 | A | 5/2006 |
| CN | 101208920 | A | 6/2008 |
| CN | 101763808 | A | 6/2010 |
| JP | 2009003155 | | 1/2009 |
| KR | 20070119202 | | 12/2007 |
| TW | 567408 | | 12/2003 |

* cited by examiner

*Primary Examiner* — Seokyun Moon
(74) *Attorney, Agent, or Firm* — WPAT, PC; Justin King

(57) ABSTRACT

A control circuit for driving a display panel is disclosed. The control circuit includes a timing controller, outputting a timing control signal; and a driving module, electrically coupled to the timing controller and the display panel for driving the display panel in response to the timing control signal, and the timing controller is switchable to a modifying state according to a driving condition of the driving module. A control method for driving a display panel is also disclosed.

13 Claims, 7 Drawing Sheets

CONTROL CIRCUIT OF DISPLAY PANEL AND CONTROL METHOD OF THE SAME

TECHNICAL FIELD

The disclosure relates to a control circuit for control a display panel, and more particularly to a control circuit for driving the display panel while optionally modifying a driving condition. The disclosure also relates to a control method for driving a display panel while optionally modifying a driving condition.

BACKGROUND

FIG. 1 is a schematic block diagram illustrating a control circuit for driving a display panel. The control circuit 10 is electrically connected to the display panel 2, and comprises a TCON (Timing Controller) 12 and a driving module 14. The driving module 14 is electrically coupled between the display panel 2 and the TCON 12, and comprises a plurality of drivers 142.

In the control circuit 10 as depicted in FIG. 1, the TCON 12 is configured to receive a frame data $S_{FRAME}$ from a host (a computer or a television, which is not shown here) and output a set of TCON signals $S_{TCON}$. The driving module 14 is configured to receive the set of TCON signals $S_{TCON}$ from the TCON 12 and through the drivers 142 correspondingly output a plurality of driving signals $S_D$ to drive pixels of the display panel 2.

With the increase of the frame rate of the display panel 2, the operational frequency of the driving signals $S_D$ for driving the display panel 2, as resulting from the set of frame data $S_{FRAME}$, is accordingly increased. If one or more parts in the control circuit 10 or in the display panel 2 have a heavy load, attenuation may occur on the driving signals $S_D$. Once the driving signals $S_D$ is over attenuated and thus incompatible with the specification of the display panel 2, the display panel 2 may not successfully display the frame data $S_{FRAME}$.

In addition, with the increase of the frame rate of the display panel 2, the power consumption is also increased in the driving module 14 so that an over high temperature may be rendered. If the operational temperature of the drivers 142 exceeds a specific value, e.g. the junction temperature, the drivers 142 are at the risk of being damaged.

Since in the control circuit 10 as depicted in FIG. 1, signals are transmitted from the TCON 12, via the driving module 14, to the display panel 2 in one way, actual driving conditions, e.g. whether intolerable attenuation of the driving signals $S_D$ or unexpected high temperature of the drivers 142 occur in the driving module 14, cannot be realized and timely modified.

SUMMARY OF DISCLOSURE

A control circuit, in accordance with an embodiment, for driving a display panel, comprises a timing controller and a driving module. The timing controller is for outputting a timing control signal in response to a frame data. The driving module is electrically coupled to the timing controller and for driving the display panel in response to the timing control signal. The timing controller is switchable to a modifying state according to a driving condition of the driving module.

A control method, in accordance with an embodiment and for driving a display panel, comprises steps of: outputting a driving signal from a driving module to the display panel for displaying a frame data in response to a timing control signal from a timing controller; detecting a driving condition of the driving module; outputting an indicating signal from the driving module to the timing controller according to the detected driving condition; modulating the timing control signal in a modifying state to modify the driving condition in response the indicating signal; and transmitting the modulated timing control signal from the timing controller to the driving module.

By imparting driving-condition detecting means to the control circuit according to the present embodiments, the driving condition can be dynamically monitored and optionally modified so as to prevent from errors or damages resulting from improper driving condition(s).

DETAILED DESCRIPTION OF EMBODIMENTS

The disclosure will now be described more specifically with reference to the following embodiments. It is to be noted that the following descriptions of embodiments are presented herein for purpose of illustration and description only. It is not intended to be exhaustive or to be limited to the precise form disclosed.

Figure 1:
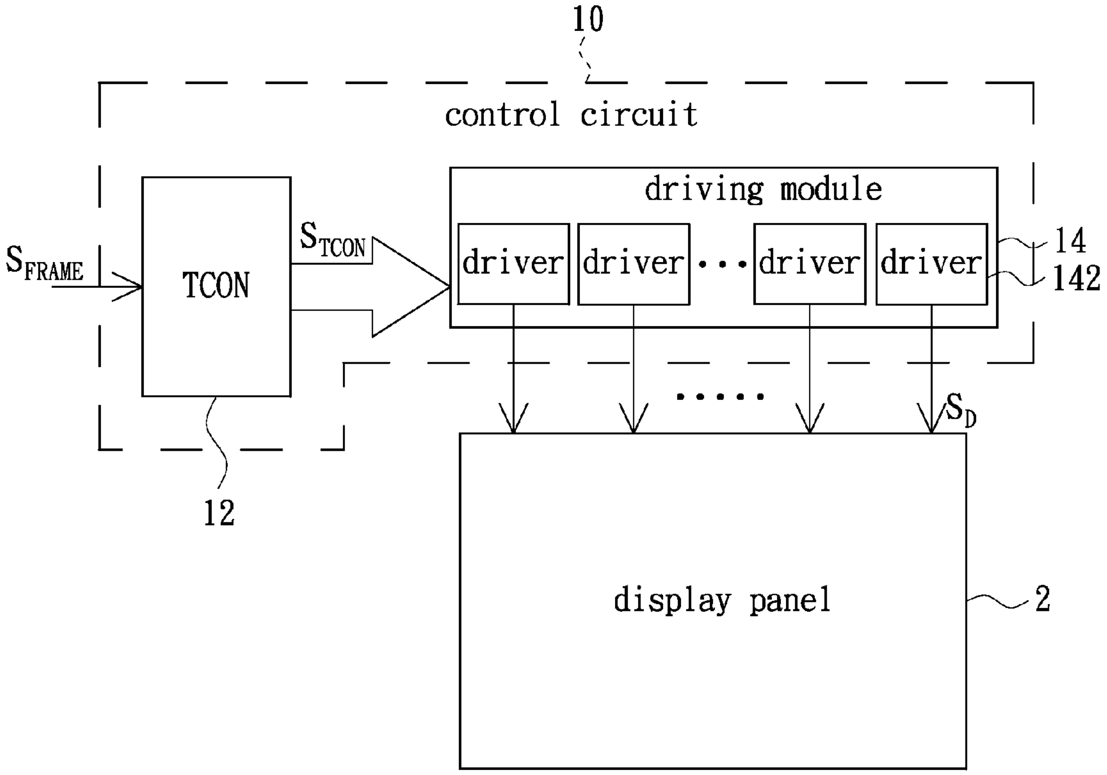
FIG. 1 is a schematic block diagram illustrating a control circuit for use with a display panel.
Figure 2:
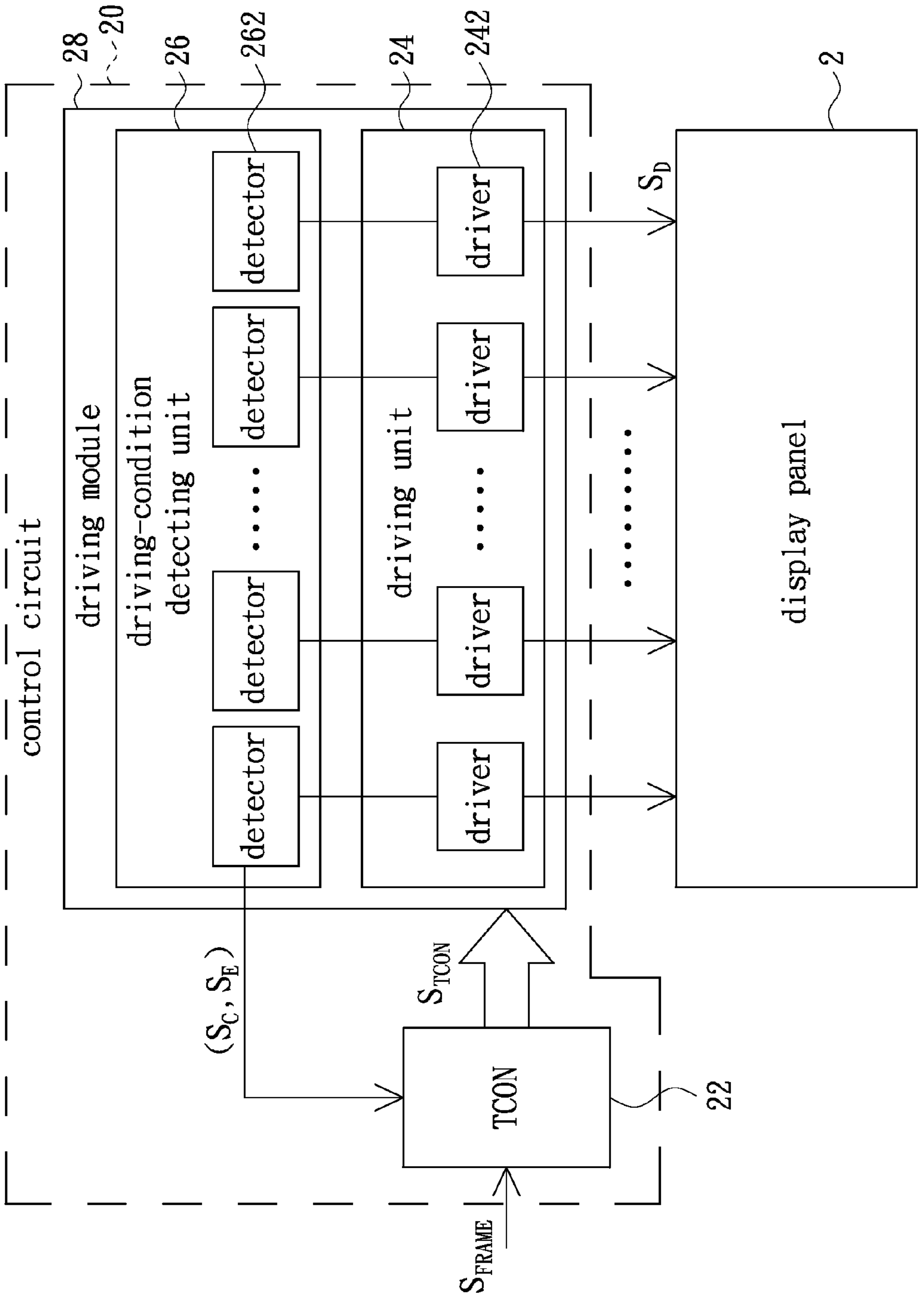
FIG. 2 is a schematic block diagram illustrating a control circuit for use with a display device in accordance with an embodiment.

As depicted in FIG. 2, a control circuit 20 is adapted to be used with a display panel 2. The control circuit 20 comprises a timing controller (TCON) 22 and a driving module 28. The driving module 28 comprises a driving unit 24 consisting of at least one driver 242 and a driving-condition detecting unit 26 consisting of at least one detector 262 respectively corresponding to the drivers 242. The driving unit 24 is electrically coupled to the display panel 2 and the TCON 22; and the driving-condition detecting unit 26 is electrically coupled to the driving unit 24 and the TCON 22. In the embodiment, the driving module 28 is implemented with one or more integrated-circuit chips. The TCON 22 is configured to receive a frame data $S_{FRAME}$ from a host (a computer system or a television system, which is not shown) and output a set of control signals $S_{TCON}$ according to the received frame data $S_{FRAME}$. The driving unit 24 is configured to receive the set of control signals $S_{TCON}$ from the TCON 22 and output a plurality of driving signals $S_D$ to drive a plurality of pixels of the display panel 2.

Each of the detectors 262 is configured to detect a driving condition of the corresponding driver 242, and an indicating signal is outputted by the driving-condition detecting unit 26 to the TCON 22 based on the driving conditions collected by the detectors 262. For example, the indicating signal $S_C$ at a first level (e.g. a low level) indicates a normal driving condition which requires no modification of the driving condition. On the other hand, if the indicating signal $S_E$ at a second level (e.g. a high level) indicates a defective driving condition, modification of the driving condition would be required. In an example, the driving condition is modified by modulating the amplitude and/or frequency of the TCON signals $S_{TCON}$. In this example, the TCON 22 will operate in a modifying state in response to the indicating signal $S_E$ and performs the modulation of the TCON signals $S_{TCON}$.

The detector 262 may vary with practical requirements. For example, if any of the detectors 262 detects that the driving signal $S_D$ outputted by the corresponding driver 242 is attenuated to a certain level, the high-level indicating signal $S_E$ will be outputted from the driving-condition detecting unit 26 to the TCON 22 so as to have the TCON 22 operate in the modifying state. In the modifying state, the TCON 22 may amplify selected ones or all of the TCON signals $S_{TCON}$ to an adequate level so as to compensate the attenuation of the driving signals $S_D$.

In another embodiment, if any of the detectors 262 detects a temperature of the corresponding driver 242 is higher than a specific value (e.g., junction temperature), the high-level indicating signal $S_E$ will be outputted from the driving-condition detecting unit 26 to the TCON 22 so as to have the TCON 22 operate in the modifying state. In the modifying state, the TCON 22 may reduce the frame rate of the TCON signal $S_{TCON}$ thereby reducing the frequency of the driving signal $S_D$. Accordingly, the temperature of the drivers 242 can be cool down to a normal level.

Figure 3A:
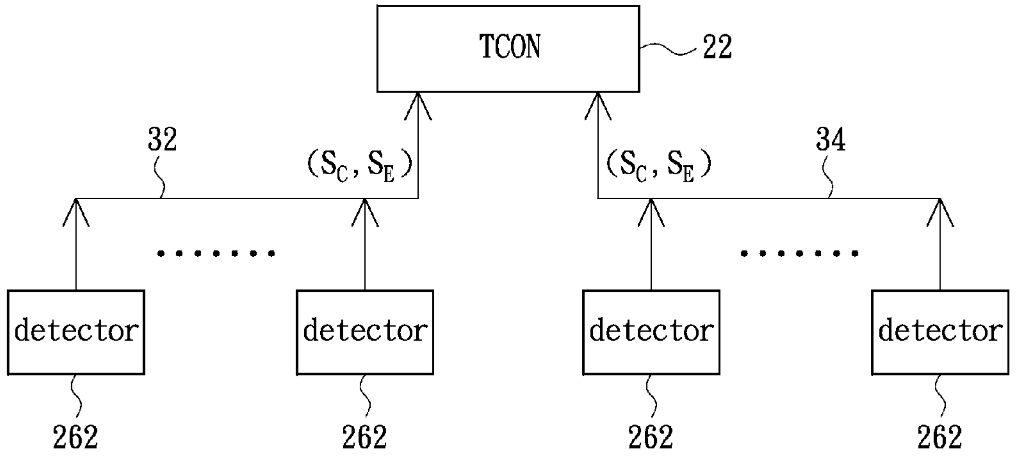
FIG. 3A is a schematic diagram illustrating a first type of connection between the detectors and the timing controller in the embodiment as illustrated in FIG. 2.

In the control circuit 20 as depicted in FIG. 2, the electric connection between the detectors 262 and the TCON 22 for the transmission of the indicating signals $S_C$ or $S_E$ can be implemented with a bus connection. FIG. 3A is a schematic diagram illustrating the bus connection. As shown, two buses 32 and 34, for example, are used between a first portion of the detectors 262 and the TCON 22, and between a second portion of the detectors 262 and the TCON 22, respectively, for transmitting the indicating signals. The bus connection is relatively simple in layout.

Figure 3B:
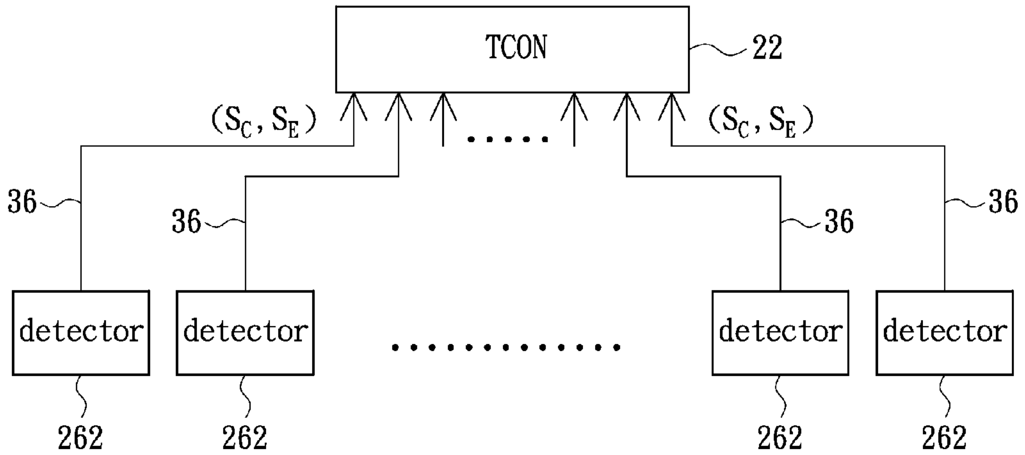
FIG. 3B is a schematic diagram illustrating a second type of connection between the detectors and the timing controller in the embodiment as illustrated in FIG. 2.

In another embodiment, the electric connection between the detectors 262 and the TCON 22 for the transmission of the indicating signals $S_C$ or $S_E$ can be implemented with a plurality of signal lines. FIG. 3B is a schematic diagram illustrating point-to-point connection. As shown, a signal line 36 is connected between each of the detectors 262 and the TCON 22 for transmitting the corresponding indicating signal. The point-to-point connection has an advantage of precisely locating the driver 242 sending the indicating signal $S_E$.

Figure 3C:
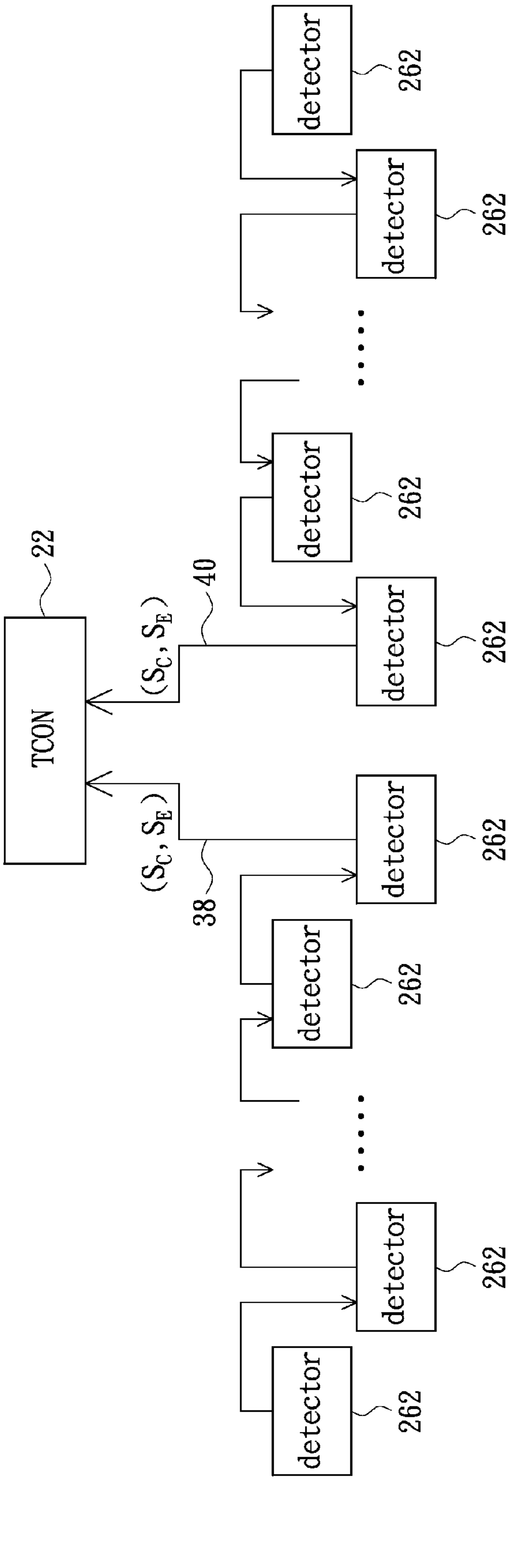
FIG. 3C is a schematic diagram illustrating a third type of connection between the detectors and the timing controller in the embodiment as illustrated in FIG. 2.

In a further embodiment, the electric connection between the detectors 262 and the TCON 22 for the transmission of the indicating signals $S_C$ or $S_E$ can be implemented with a cascade configuration. FIG. 3C is a schematic diagram illustrating the cascade connection. As shown, the detectors 262 are coupled in series with a starting one further coupled to the TCON 22 through a signal line. The detectors 262 may be separately grouped and coupled to the TCON 22 through respective signal lines. For example, two groups of detectors 262 are coupled to the TCON 22 through signal lines 38 and 40, respectively.

Figure 4:
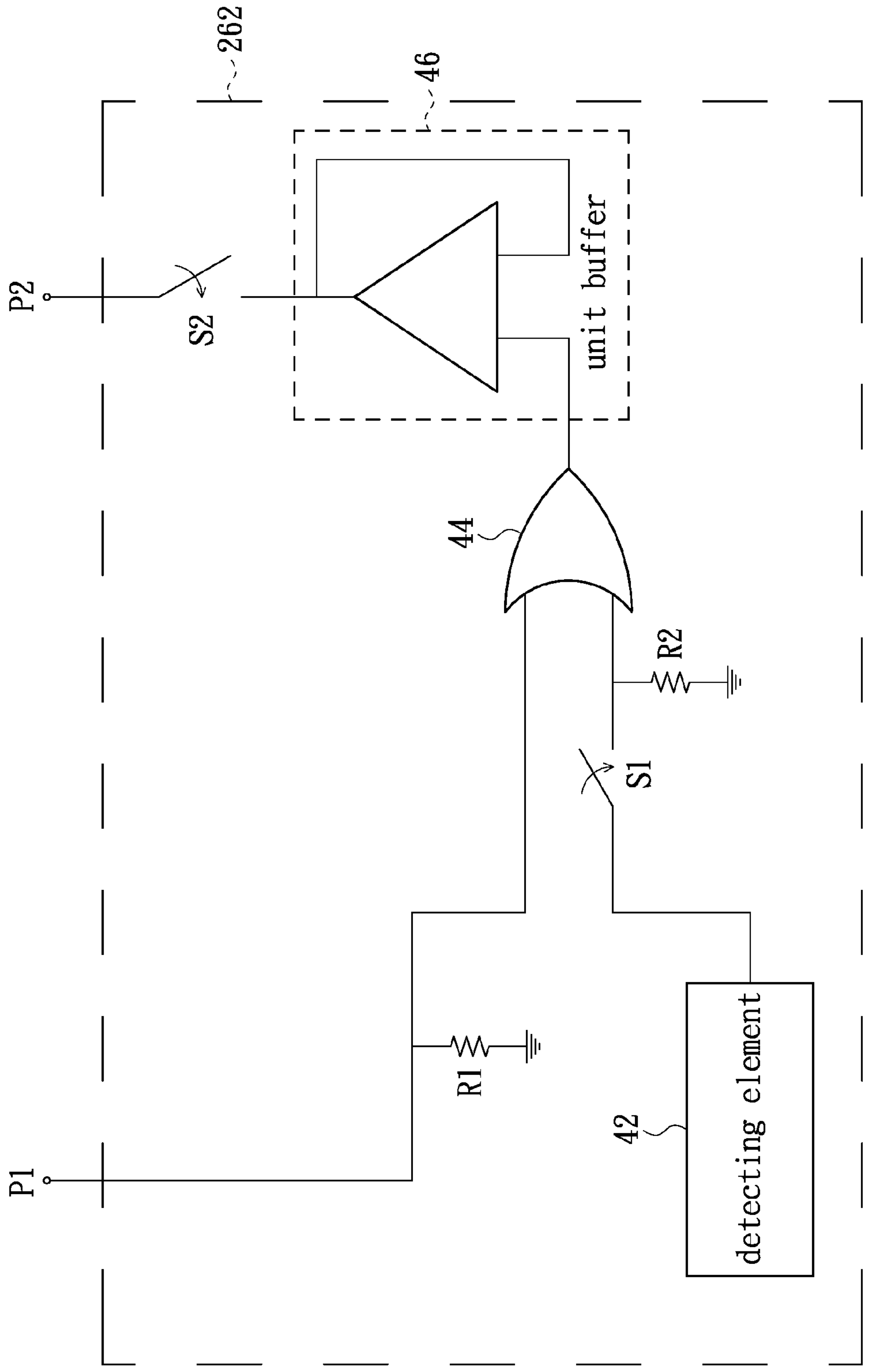
FIG. 4 is a schematic circuit diagram illustrating an example of a driving-condition detector in the embodiment as illustrated in FIG. 2.

An example but not the only example of the detector 262 is a logic gate. FIG. 4 is a schematic circuit diagram illustrating the detector 262, which includes a detecting element 42, an OR gate 44, a unit buffer 46, a first switch S1, a second switch S2, a first resistor R1 and a second resistor R2. The detecting element 42 may vary with the driving condition to be monitored, and the configuration of the elements included in the detector 262 may vary with the electric connection thereof to the TCON 22. For example, for the bus connection as depicted in FIG. 3A or the point-to-point connection as depicted in FIG. 3B, the input terminal P1 is grounded so that one of the input terminals of the OR gate 44 receives a low-level input; and the output terminal P2 is configured to be electrically coupled to the TCON 22. On the other hand, for cascade connection as depicted in FIG. 3C, the input terminal P1 is configured to be electrically coupled to the output terminal P2 of a preceding stage detector 262.

The first switch S1 is disposed between the other input terminal of the OR gate 44 and the detecting element 42. The first switch S1 is selectively conducted so as to allow the output of the detecting element 42 to be transmitted to the input terminal of the OR gate 44 when a signal at a certain level (e.g., high level) is outputted by the detecting element 42 to indicate a driving condition to be modified. Since the OR gate 44 receives the signal at a low level through one input terminal P1 for the bus connection or the point-to-point connection and receives the signal at a high level through the other input terminal, the high-level signal received from the detecting element 42 will be outputted by the OR gate 44 and transmitted to the TCON 22 sequentially through the unit buffer 46, the second switch S2 in a conductive state and the output terminal P2. The high-level signal, serving as the indicating signal $S_E$, has the TCON 22 enter the modifying state.

On the other hand, with reference to the example of the cascade connection, the input terminal P1 of a detector 262 other than the first ones is electrically coupled to a preceding-stage detector, and the output terminal P2 thereof is electrically coupled to a next-stage detector. Accordingly, if the preceding-stage detector outputs a low-level signal indicating a normal state of its detecting result, a low-level signal will be inputted to the OR gate 44 of the detector 262 as shown through the input terminal P1. Otherwise, if the preceding-stage detector outputs a high-level signal indicating an abnormal state of its detecting result, what is inputted to the OR gate 44 of the detector 262 as shown through the input terminal P1 will be a high-level signal. The low-level or high-level signal is then logically operated by the OR gate 44 with another signal inputted through the other input terminal of the OR gate 44, which reflects the detecting result of the detecting element 42 of the detector 262 as shown and may be at a low level (when normal) or a high level (when abnormal). Based on the inputs to the OR gate 44, a signal at a low level (when normal) or a high level (when abnormal) is transmitted to the next-stage detector sequentially through the unit buffer 46, the second switch S2 in a conductive state and the output terminal P2. The high-level signal, if present, will be propagated through downstream detectors 262 and finally transmitted to the TCON 22 as an indicating signal $S_E$ requiring modification of the driving condition.

Figure 5A:
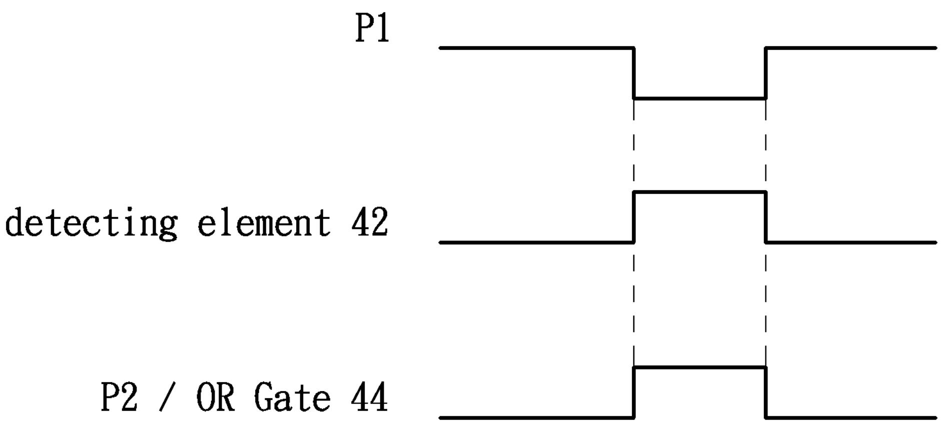
FIG. 5A is a wave form illustrating a specific condition that a preceding-stage detector detects a normal state but a present detector detects an abnormal state.

For example, FIG. 5A is a wave form illustrating a specific condition that a preceding-stage detector detects a normal state but the detector 262 detects an abnormal state. As shown, because the preceding-stage detector detects a normal state, a low-level signal is inputted to one of the input terminal of the OR gate 44 of the detector 262 through the input terminal P1; and because the detecting element 42 of the detector 262 detects an abnormal state, a high-level signal is inputted to the other input terminal of the OR gate 44 of the detector 262. Therefore, a high-level signal, which indicates at least one detector 262 detecting an abnormal state, is outputted from the output terminal of the OR gate 44 and further transmitted to the output terminal P2 of the detector 262.

Figure 5B:
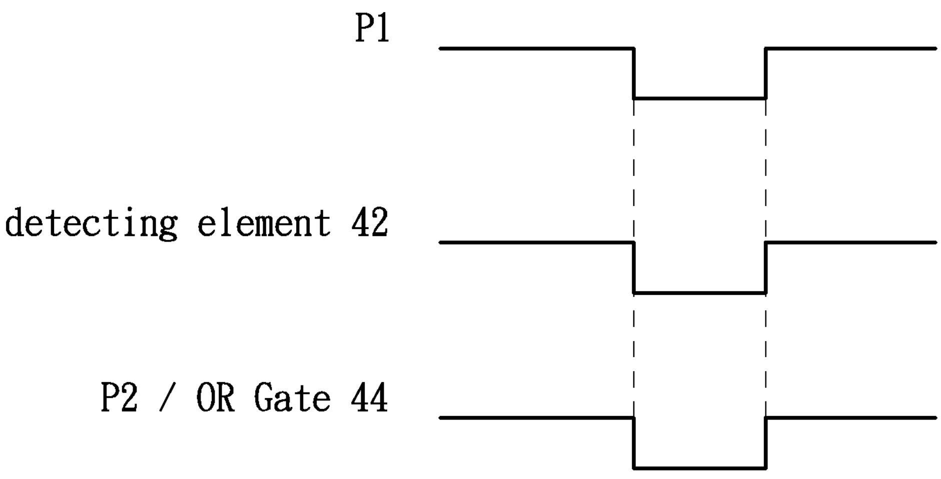
FIG. 5B is a wave form illustrating a specific condition that both a preceding-stage detector and a present detector detect a normal state.

FIG. 5B is a wave form illustrating a specific condition that both a preceding-stage detector and the detector 262 detect a normal state. As shown, because the preceding-stage detector detects a normal state, a low-level signal is inputted to one input terminal of the OR gate 44 of the detector 262 through the input terminal P1; and because the detecting element 42 of the detector 262 also detects a normal state, a low-level signal is inputted to the other input terminal of the OR gate 44 of the detector 262. Therefore, a low-level signal, which indicates no any detector detecting an abnormal state, is outputted from the output terminal of the OR gate 44 and further transmitted to the output terminal P2 of the detector 262.

Figure 6:
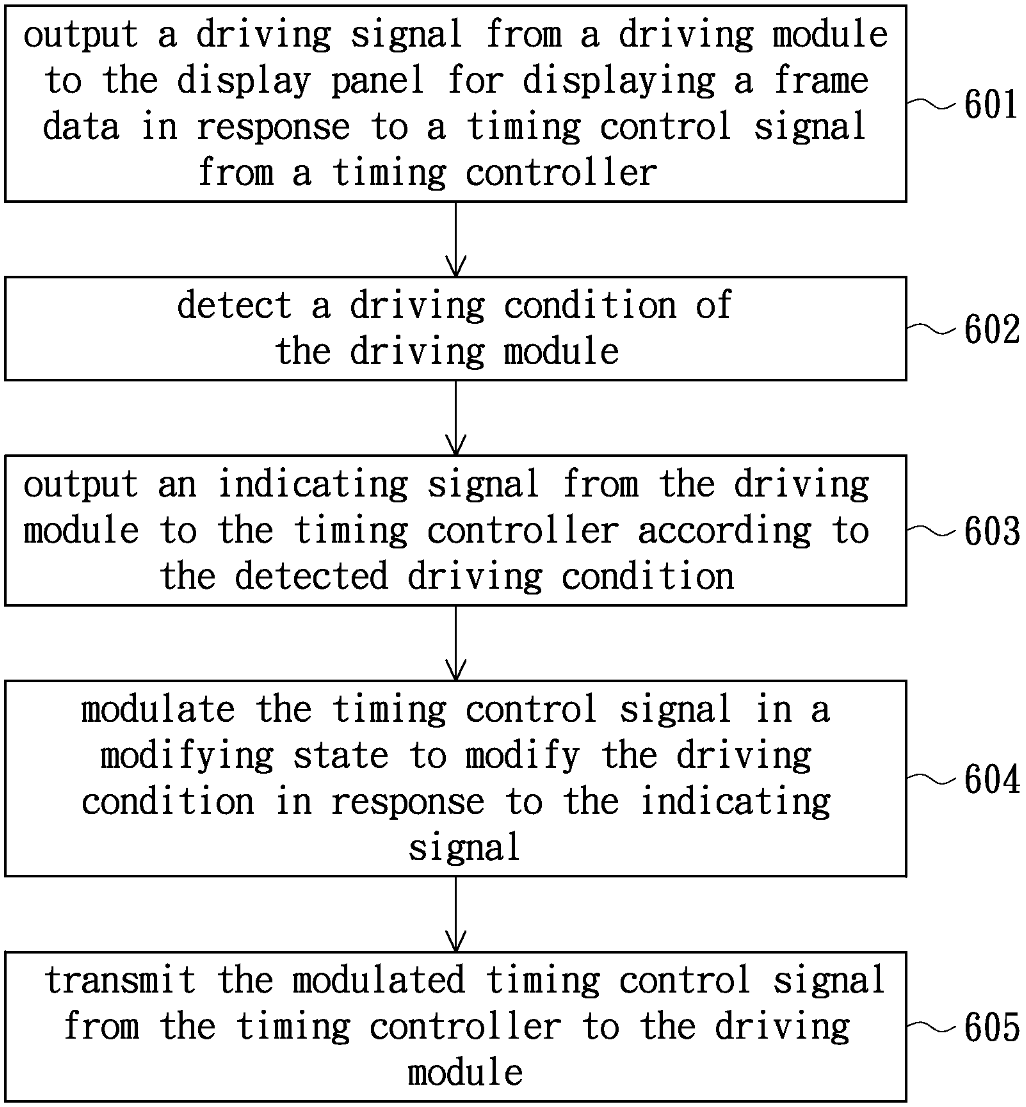
FIG. 6 is a schematic flow chart illustrating a control method for driving a display panel in accordance to an embodiment of the present invention.

FIG. 6 is a schematic flow chart illustrating a control method for driving a display panel in accordance to an embodiment of the present invention. First, a driving signal is outputted from a driving module to the display panel for displaying a frame data in response to a timing control signal from a timing controller (step 601). A driving condition of the driving module is being detected (step 602). An indicating signal is outputted from the driving module to the timing controller according to the detected driving condition (step 603). The timing control signal is modulated in a modifying state to modify the driving condition in response to the indicating signal (step 604). The modulated timing control signal is transmitted from the timing controller to the driving module (step 605). Specifically, in step 603, the indicating signal is outputted when the driving condition is detected to be abnormal due to attenuation of the driving signal, and an amplitude of the timing control signal is modulated to be increased in the modifying state; or, when the driving condition is detected to be abnormal due to a temperature of the driving module beyond a specified range, and a frame rate of the timing control signal is modulated to be reduced in the modifying state.

To sum up, by introducing the driving-condition detector to the control circuit according to the present disclosure, the driving condition can be dynamically monitored and optionally modified so as to prevent from errors or damages resulting from improper driving condition(s).

It is to be noted that the abnormal or defective driving condition indicated herein is not limited to the examples given above, e.g. over attenuation or too-high temperature, and any other one or more driving conditions desirable to be controlled can be included and modified.

In addition, it is to be noted that although an OR gate is used in the control circuit for operating the detecting result into the indicating signal in the embodiments described above, other types or a combination of logic gates, such as an AND gate, or other circuitry may also be used for similar objectives.

While the disclosure has been described in terms of what is presently considered to be the most practical and embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control circuit for driving a display panel, comprising:

a timing controller, outputting a timing control signal in response to a frame data; and a driving module, coupled to the timing controller and the display panel for driving the display panel in response to the timing control signal, wherein the timing controller is switchable to a modifying state according to a driving condition of the driving module, the driving module comprises:

a driving unit, electrically coupled to the timing controller and the display panel for outputting a driving signal to drive the display panel in response to the timing control signal; and a driving-condition detecting unit, electrically coupled to the timing controller and the driving unit for detecting the driving condition of the driving unit, and outputting an indicating signal indicating the driving unit in an abnormal state to control the timing controller to operate in the modifying state, wherein the driving-condition detecting unit comprises at least one detector, and the detector comprises:

a detecting element, electrically coupled to one of the drivers for detecting the driving condition and outputting a signal when the driving condition is detected to be abnormal; and a logic gate communicable with the detecting element for operating the signal from the detecting element into the indicating signal;

wherein one input terminal of the logic gate is coupled to an output terminal of another detector.

2. The control circuit according to claim 1, wherein the driving-condition detecting unit comprises at least one detector; the driving unit comprises at least one driver; the detector is electrically coupled to one corresponding driver; and the detector is configured to optionally and independently output the corresponding indicating signal to the timing controller.

3. The control circuit according to claim 1, wherein the driving-condition detecting unit comprises a plurality of detectors divided into at least one group; the driving unit comprises a plurality of drivers; each of the detectors is electrically coupled to one corresponding driver; and the detectors in the same group are electrically interconnected in cascade manner to optionally output the indicating signal to the timing controller.

4. The control circuit according to claim 1, wherein when the driving condition is detected to be abnormal due to attenuation of the driving signal outputted from the driving unit, the amplitude of the timing control signal is increased in the modifying state.

5. The control circuit according to claim 1, wherein when the driving condition is detected to be abnormal due to a temperature of the driving unit beyond a specified range, a frequency of the timing control signal is reduced in the modifying state.

6. The control circuit according to claim 1, wherein the detector further comprises a switch for communicating the detecting element with the logic gate.

7. The control circuit according to claim 1, wherein one input terminal of the logic gate is coupled to a ground level.

8. A control circuit for driving a display, comprising:

a timing controller, outputting a timing control signal in response to a frame data; and a switch, coupled to the timing controller and a driving module;

wherein the switch is controllable and the timing controller is switchable to a modifying state according to a driving condition of the driving module;

wherein the driving module comprises:

a driving unit, electrically coupled to the timing controller and a display panel for outputting a driving signal to drive the display panel in response to the timing control signal; and a driving-condition detecting unit, electrically coupled to the timing controller and the driving unit for detecting the driving condition of the driving unit, and outputting an indicating signal indicating the driving unit in an abnormal state to control the timing controller to operate in the modifying state;

wherein the driving-condition detecting unit comprises at least one detector; the driving unit comprises at least one driver; the detector is electrically coupled to one corresponding driver; and the detector is configured to optionally and independently output the corresponding indicating signal to the timing controller;

wherein the detector comprises:

a detecting element, electrically coupled to one of the drivers for detecting the driving condition and outputting a signal when the driving condition is detected to be abnormal; and a logic gate communicable with the detecting element for operating the signal from the detecting element into the indicating signal;

wherein one input terminal of the logic gate is coupled to an output terminal of another detector.

9. The control circuit according to claim 8, wherein the driving-condition detecting unit comprises a plurality of detectors divided into at least one group; the driving unit comprises a plurality of drivers; each of the detectors is electrically coupled to one corresponding driver; and the detectors in the same group are electrically interconnected in cascade manner to optionally output the indicating signal to the timing controller.

10. The control circuit according to claim 8, wherein when the driving condition is detected to be abnormal due to attenuation of the driving signal outputted from the driving unit, the amplitude of the timing control signal is increased in the modifying state.

11. The control circuit according to claim 8, wherein when the driving condition is detected to be abnormal due to a temperature of the driving unit beyond a specified range, a frequency of the timing control signal is reduced in the modifying state.

12. The control circuit according to claim 8, wherein the detector further comprises a switch for communicating the detecting element with the logic gate.

13. The control circuit according to claim 8, wherein one input terminal of the logic gate is coupled to a ground level.

* * * * *